July 28, 1942.  B. WEICHT ET AL  2,290,925
HEAT CONTROL FOR WELDING MACHINES
Filed March 28, 1941
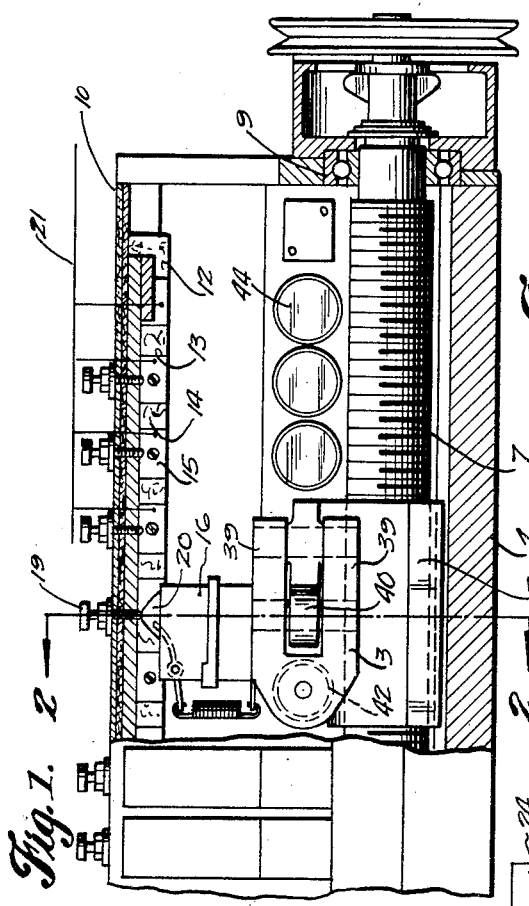
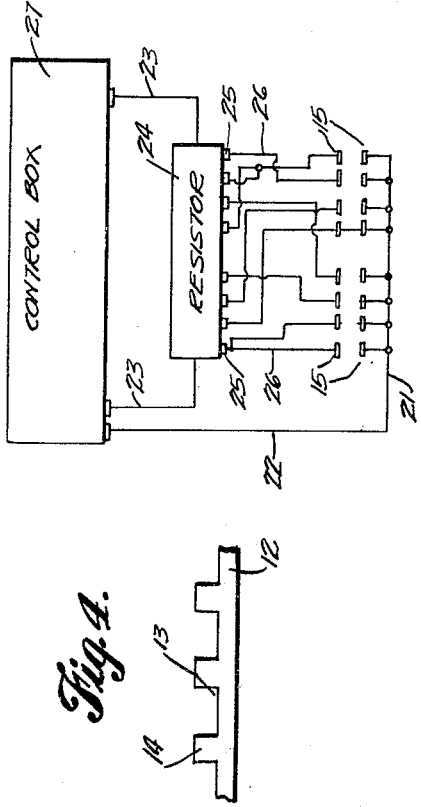
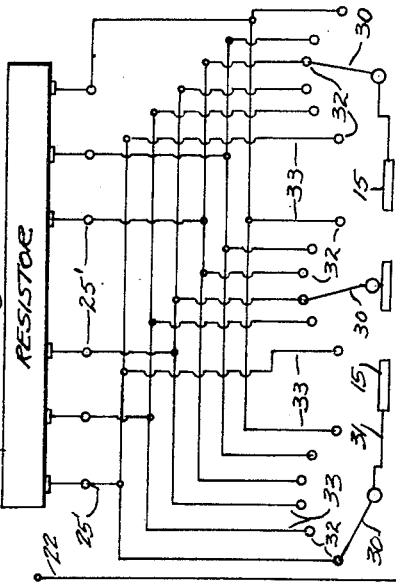
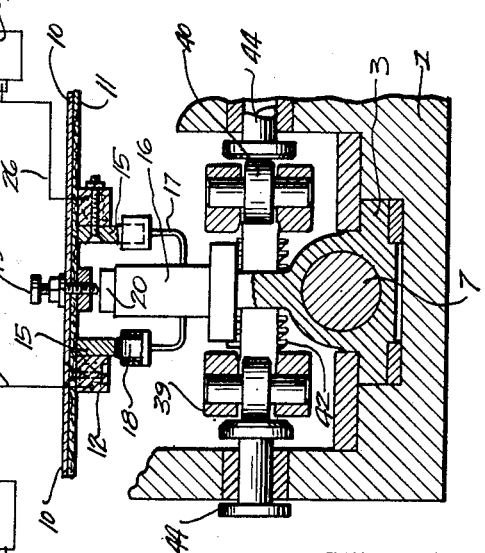
INVENTORS.
BRUNO WEICHT
MAX. A. SIEVERS.
BY Samuel Weisman

UNITED STATES PATENT OFFICE 2,290,925

HEAT CONTROL FOR WELDING MACHINES

Bruno Weicht and Max A. Sievers, Detroit, Mich.

Application March 28, 1941, Serial No. 385,736

8 Claims. (Cl. 171—97)

The present invention pertains to a novel heat control adjustment for welding machines. The principal object is to improve upon and refine the so-called heat control now in use.

The prior art device is an electronic phase-shifter that regulates the current value supplied to the primary circuit and in turn to the electrodes in the secondary circuit. It is known as a heat control for the reason that the heat produced at the weld is proportional to the square of the current. This device is adjustable for the entire circuit but not for the separate or individual electrode circuits. Such individual adjustment is however desirable inasmuch as the current requirements of the different electrodes may vary by reason of unequal metal thicknesses to be welded, or the actual current input may vary by reason of unequal conditions in the circuits.

More specifically, the object of the present invention is to enable such individual current control or regulation for the electrodes. This object is accomplished essentially by inserting a tapped resistor between the prior art heat control and the segments of the timing track in the primary circuit. By connecting the proper taps to the segments, the current may be individually regulated for each pair of electrodes after it has been regulated generally for the entire set of electrodes by means of the prior art control.

The invention is fully disclosed by way of example in the following description and in the accompanying drawing in which:

Figure 1 is a detail vertical section of the distributor;

Figure 2 is a section on the line 2—2 of Figure 1;

Figure 3 is a wiring diagram;

Figure 4 is a fragmentary elevation of the insulation strip, and

Figure 5 is a wiring diagram of a modification.

Reference to these views will now be made by use of like characters which are employed to designate corresponding parts throughout.

Numeral 1 designates the housing or body of the distributor of a welding machine, which is described in detail in the co-pending application of Max A. Sievers and Carl Raab, Serial No. 382,966 filed March 12, 1941. As in said application, a carriage 3 is slidably mounted for movement lengthwise in the housing 1, and through the carriage is threaded a feed screw 7 journalled in the housing at 9 and driven by any suitable means.

In opposite sides of the housing 1 are mounted plunger rods 44 adapted to close corresponding electrode switches not shown here but fully disclosed in the above mentioned co-pending application. For operating the switches sequentially the carriage is provided with a pair of arms 39 pivotally attached thereto and separated by a spring 42. Each arm carries a roller 40 adapted to ride on the corresponding row of rods 44 and depress them in sequence to close the switches as the carriage is propelled by the screw 7.

The top of the housing 1 is closed by a cover plate 10 having an insulated lining 11. To the lower surface of the cover plate are secured two spaced and parallel segment supports, each consisting of a longitudinal strip 12 of an insulation such as fiber. The opposed faces of these strips are notched or milled at regular intervals and equally at 13, forming projecting blocks 14 for a purpose that will presently appear. In the spaces 13 are secured conducting segments or blocks 15 of a conducting material such as brass.

The carriage 3 also supports a so-called micro-switch 16 that lies between the two rows of segments 15. Conducting arms 17 extend in opposite directions from the switch 16 and carry rollers or brushes 18 adapted to ride respectively on the rows of segments 15, thereby establishing electrical communication between the rows through the switch. When current is supplied to the rows of segments 15 by the means presently to be described, the micro-switch 16 governs the number of current cycles flowing between opposed segments engaged by the brushes 18. In other words, this is a device for timing the duration of the current flow. For each pair of opposed segments a screw 19 is adjustably mounted in the cover plate 10 and is engageable by an adjustable or movable portion 20 of the micro-switch while the brushes 18 join the corresponding pair of opposed segments. An individual timing adjustment is thus provided for each pair of segments.

The segments of one of the rows are wired individually and respectively to the secondary circuits of the electrode switches which are fully disclosed in the co-pending application. The segments of the remaining row are interconnected by a common line or bus bar 21 so that they are no longer mutually insulated. In fact they may constitute a single continuous conductor but are made as shown herein only as a matter of shop practice.

One side of the circuit is represented by a line 22 connected to the common conductor 21. The other side 23 of the circuit is connected to a resistor 24 of any suitable design, having a series of taps 25 representing various amounts of resistance in the circuit. The taps are connected selectively to the mutually insulated segments 15 for a purpose that will presently be described, by means of suitable conductors 26.

Both lines 22 and 23 pass through an adjustable current control device, designated generally by the numeral 27, known in the art as a "heat control," since the heat produced in the weld is proportional to the square of the current. The adjustment is ordinarily made by means of a dial in the form of a potentiometer to which one of the leads is connected, but in this case the dial is eliminated, as will presently appear.

The control device specifically is not a part of this invention but a brief description thereof is considered necessary. The device is fully described in the General Electric Review of March 1937, pages 116 to 124 inclusive (reprint pages 5 to 10 inclusive). It is in the nature of a phase-shifter displacing the line voltage wave relatively to the primary and secondary current waves. By means of the dial the point on the voltage wave at which the current starts to flow is selected. This point is the same for each weld, and the current stops at the zero point on the current wave after the passage of the number of cycles for which the timing adjustment has been set.

The device depends for its operation on the firing of a thyratron tube controlling an ignition tube for passing the half cycles at one side of the zero line. A similar set is connected in "inverse-parallel" relation to the first set and passes the remaining half cycles. Thus, the combination of two sets serves to pass alternating current. The phase-shift relation determines the point on each half cycle of anode-cathode voltage at which the thyratron tube will ionize or fire. The above mentioned potentiometer for making the adjustment is connected between a reactor and a resistor in the control device.

Hitherto the control device has been connected directly to the insulated segments 15, and in such case its effect is uniform on all the segments. However, such uniform control is often inadequate since conditions and requirements at the several electrodes may not be uniform, by reason of different thicknesses of metal there, unequal cable lengths between the secondary electrode switches and the electrodes, and other varying characteristics in the several electrode circuits. The tapped resistor 24 between the control device 27 and the insulated segment 15 compensates for irregularities due to the causes named above.

By selection of the proper taps, the current input at the several electrodes may be made uniform or unequal according to predetermined values. The control elements herein described are in the primary circuit and the electrodes in the secondary circuit.

The current control used in conjunction with the invention requires a means for blocking the thyratron tube at zero current. This is provided in the form of a negative bias on the grid of the thyratron tube, which blocks the tube at zero without requiring the circuit to be opened elsewhere.

In the preferred construction shown in Figure 5, there is provided a selector switch for each insulated segment 15. Each selector switch embodies an adjustable arm 30 connected at 31 to a segment and movable over a set of contacts 32 equal in number to the taps 25' of the resistor 27' and connected respectively thereto by conductors 33. Thus, the tap selection for any segment 15 is made at its selector switch rather than by re-arranging the connections at the taps.

The prior art control 27 is common to the segments 15 and exerts a uniform effect on them, but the present invention enables this effect to be individually adjusted according to requirements and conditions at the several electrodes.

Although specific embodiments of the invention have been illustrated and described, it will be understood that various alterations in the details of construction may be made without departing from the scope of the invention as indicated by the appended claims.

What we claim is:

1. In a welding machine of the multiple electrode type, a multiple of mutually insulated segments, complementary conducting means spaced from said brushes, a brush travelling over said segments and complementary means and adapted to electrically connect said segments to said means, a current control device connected to said complementary means and adapted for connection to a current source, a tapped resistor between said device and said segments, and means for connecting the taps of said resistor individually and selectively to said segments.

2. In a welding machine of the multiple electrode type, a multiple of mutually insulated segments, an electrically continuous conductor opposite said segments, a contact device travelling over said segments and conductor to electrically connect said segments to said means, a current control device connected to said conductor and adapted for connection to a current source, a tapped resistor between said device and said segments, and means for connecting the taps of said resistor individually and selectively to said segments.

3. In a welding machine of the multiple electrode type, a series of mutually insulated segments, complementary conducting means spaced from said brushes, a brush travelling over said segments and complementary means and adapted to electrically connect said segments to said means, an electronic current control device connected to said complementary means and adapted for connection to a current source, a tapped resistor between said device and said segments, and means for connecting the taps of said resistor individually and selectively to said segments.

4. In a welding machine of the multiple electrode type, a series of mutually insulated segments, an electrically continuous conductor opposite said segments, a contact device travelling over said segments and conductor to electrically connect said segments to said means, an electronic current control device connected to said conductor and adapted for connection to a current source, a tapped resistor between said device and said segments, and means for connecting the taps of said resistor individually and selectively to said segments.

5. In a welding machine of the multiple electrode type, a multiple of mutually insulated segments, complementary conducting means spaced from said brushes, a brush travelling over said segments and complementary means and adapted to electrically connect said segments to said means, a current control device connected to said complementary means and adapted for connection to a current source, a tapped resistor between said device and said segments, and a multiple selector switch for each segment, each such switch having contacts connected respectively to the taps of the resistor and an arm movable over said contacts and connected to the corresponding segment.

6. In a welding machine of the multiple electrode type, a multiple of mutually insulated segments, an electrically continuous conductor opposit said segments, a contact device travelling over said segments and conductor to electrically connect said segments to said means, a current control device connected to said conductor and adapted for connectin to a current source, a tapped resistor between said device and said segments, and a multiple selector switch for each segment, each such switch having contacts connected respectively to the taps of the resistor and an arm movable over said contacts and connected to the corresponding segment.

7. In a welding machine of the mutiple electrode type, a series of mutually insulated segments, complementary conducting means spaced from said brushes, a brush travelling over said segments and complementary means and adapted to electrically connect said segments to said means, a current control device connected to said complementary means and adapted for connection to a current source, a tapped resistor between said device and said segments, means for connecting the taps of said resistor individually and selectively to said segments, a variable cycle metering switch carried with said brush and governing the current flowing in said brush, and an individual adjusting member at each segment engageable by said metering switch to determine the number of cycles flowing through each segment.

8. In a welding machine of the multiple electrode type, a series of mutually insulated segments, an electrically continuous conductor opposite said segments, a contact device travelling over said segments and conductor to electrically connect said segments to said means, a current control device connected to said conductor and adapted for connection to a current source, a tapped resistor between said device and said segments, means for connecting the taps of said resistor individually and selectively to said segments, a variable cycle metering switch carried with said brush and governing the current flowing in said brush, and an individual adjusting member at each segment engageable by said metering switch to determine the number of cycles flowing through each segment.

BRUNO WEICHT.
MAX A. SIEVERS.